(No Model.)
J. B. SCHERMERHORN.
MEDICINE DROPPER.
No. 603,973. Patented May 10, 1898.
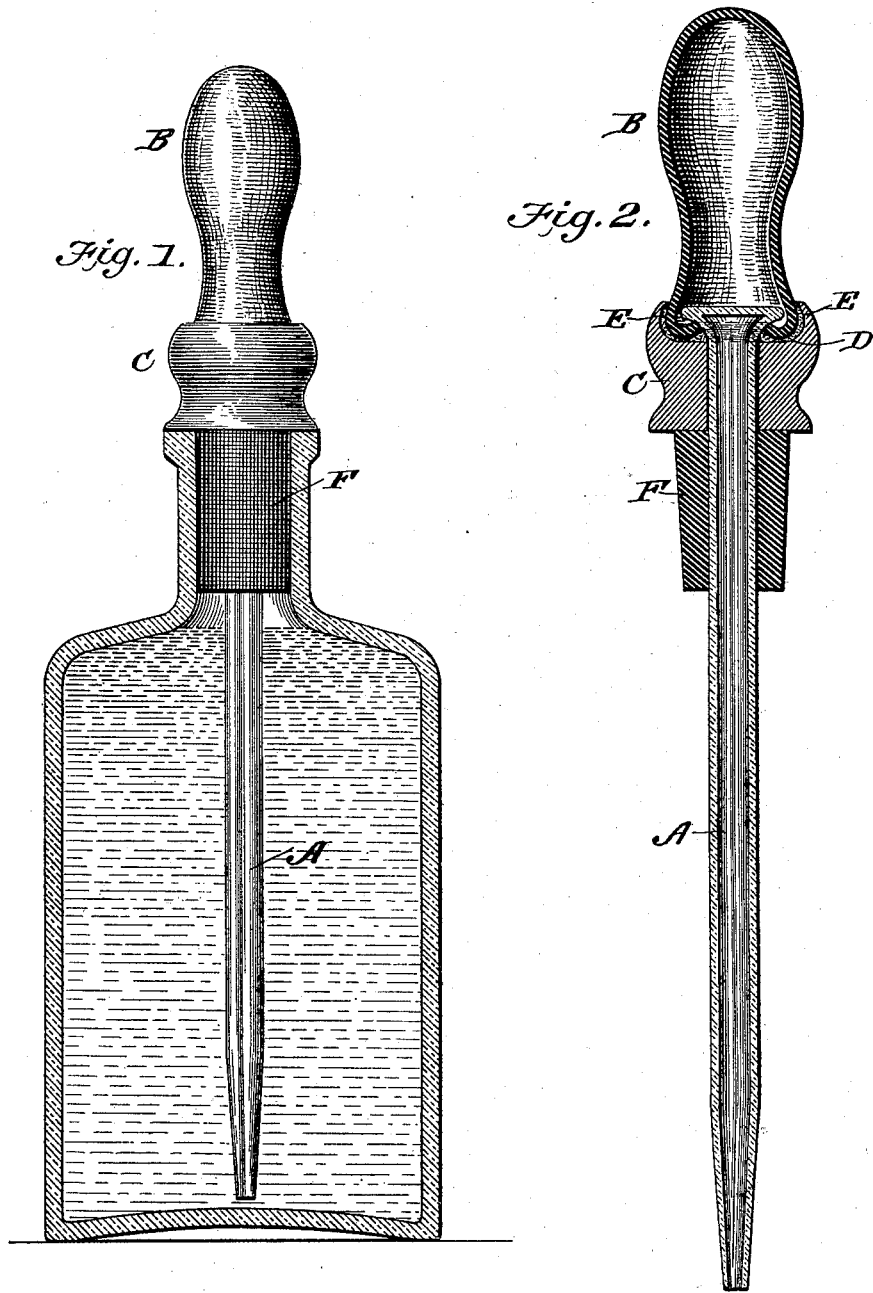
WITNESSES:
M.T. Bloudel
F.L. Stitt
INVENTOR
James B. Schermerhorn.
BY Munn & Co.
ATTORNEYS.

UNITED STATES PATENT OFFICE.

JAMES B. SCHERMERHORN, OF MALDEN, NEW YORK.

MEDICINE-DROPPER.

SPECIFICATION forming part of Letters Patent No. 603,973, dated May 10, 1898.

Application filed July 20, 1897. Serial No. 645,286. (No model.)

*To all whom it may concern:*

Be it known that I, JAMES B. SCHERMERHORN, a citizen of the United States, residing at Malden, in the county of Ulster and State of New York, have invented a new and useful Improvement in Medicine-Droppers, of which the following is a specification.

My invention relates to improvements in that class of medicine-droppers constructed of a glass tube and a rubber nipple secured thereto; and it has for its object the protection of the dropper against breakage and loss.

To these ends the invention consists in a certain arrangement of a part of the dropper in a protecting-case which is adapted to form a part of the stopper of a bottle, so that the dropper when not in use may be inserted in the bottle and be always at hand when wanted.

Reference is to be had to the accompanying drawings, forming a part of this specification, in which like characters of reference indicate corresponding parts in both the views.

Figure 1 is a side view of my improved dropper in place in a bottle, and Fig. 2 is a vertical section of the same.

To the glass tube A is secured the usual rubber nipple B. The protecting-casing or holder C is of wood or other similar non-frangible material, and is provided with a central bore by which it is inserted upon the glass tube A, and the casing C is further provided on its upper face with a circular recess D, whose side wall is undercut, as at E, to correspond to the shape of and to receive the lower edge of the nipple and the upper edge of the glass tube. When the casing or holder C is in position, as shown in Fig. 2, cement or other adhesive substance is poured in between the adjacent edges of the said casing and the nipple, whereby the former is securely held in place. Below the casing C on the glass tube A is fitted the cork or rubber stopper F, which has its upper surface adhered to the adjacent surface of the casing. The medicine-dropper is now ready to be placed in the bottle, as shown in Fig. 1, where it will be seen that the protection-casing C not only forms a part of the bottle-stopper, but amply protects the glass tube from breakage.

I am aware that it is not broadly new to combine a dropper for liquid with a bottle-stopper and do not claim such broad construction; but it has heretofore been done by merely thrusting the glass tube through a cork and fitting a rubber nipple over that end of the tube which projected above the cork. However, with such construction the tube is very liable to be accidentally broken, as the upper part of the tube is in no wise protected should the bottle be overturned or the device dropped.

What I claim, and desire to secure by Letters Patent, is—

As a new article of manufacture, the herein-described medicine-dropper comprising the glass tube and rubber nipple secured thereto, a protective casing fitting on said tube and having a recess on its upper face receiving the lower edge of the nipple and the adjacent edge of the tube the side wall of said recess being undercut, whereby to receive an adhesive substance, and a stopper fitted on said tube below said protective casing, to which it is secured, said stopper being of a diameter less than said casing, whereby the latter will project over the upper edge of a bottle in whose neck the said stopper is inserted, as and for the purpose set forth.

JAMES B. SCHERMERHORN.

Witnesses:
HENRY RANSOME,
OSCAR J. MANTON.